United States Patent [19]

Cremer

[11] 3,987,210

[45] Oct. 19, 1976

[54] METHOD FOR PRODUCING FRENCH FRIED POTATOES

[75] Inventor: Charles W. Cremer, Decatur, Ill.

[73] Assignee: A. E. Staley Manufacturing Company, Decatur, Ill.

[22] Filed: Jan. 11, 1974

[21] Appl. No.: 432,777

Related U.S. Application Data

[63] Continuation of Ser. No. 874,037, Nov. 4, 1969, abandoned.

[52] U.S. Cl. ............................. 426/550; 426/578; 426/637; 426/441; 426/808
[51] Int. Cl.² ................................................ A23L 1/10
[58] Field of Search ........... 426/342, 343, 346, 347, 426/350, 372, 438, 441, 285, 290, 296, 549, 550, 555, 560, 578, 579, 637, 640, 445, 446, 455, 456, 808, 573

[56] References Cited
UNITED STATES PATENTS

| | | | |
|---|---|---|---|
| 3,027,258 | 3/1962 | Markakis | 426/347 |
| 3,085,020 | 4/1963 | Backinger | 426/372 |
| 3,109,739 | 11/1963 | Hilton | 426/441 |
| 3,282,704 | 11/1966 | Fritzberg | 426/441 |
| 3,396,036 | 8/1968 | Liepa | 426/372 |
| 3,399,062 | 8/1968 | Willard | 426/347 |
| 3,468,673 | 9/1969 | Keller | 426/441 |

OTHER PUBLICATIONS

Starch Chemistry and Technology I, p. 45 Whitler and Paschall, Academic Press, NY 1965.
Chemistry and Industry of Starch 2nd Ed. R. Kerr (ed), Academic Press Inc. NY 1950.

*Primary Examiner*—Norman Yudkoff
*Assistant Examiner*—Martin G. Mullen
*Attorney, Agent, or Firm*—M. Paul Hendrickson; Charles J. Meyerson

[57] ABSTRACT

A method of producing French fried potatoes from dehydrated potato granules or flakes with a binder comprising an amylose starch component and a cold-water-dispersible starch or gum component. The dehydrated potatoes and binder are combined with water to produce a dough which is formed into a desired shape and deep fat fried to produce French fried potatoes.

22 Claims, No Drawings

METHOD FOR PRODUCING FRENCH FRIED POTATOES

This application is a continuation of U.S. Pat. application Ser. No. 874,037, entitled "Method For Producing French Fried Potatoes," filed on Nov. 4, 1969 by Charles W. Creme and now abandoned.

The present invention relates generally to an edible product comprising dehydrated potatoes which product can be made into French fried potatoes. More particularly, the present invention relates to an edible potato dough product comprising a novel binder which provides improved extruded French fried potatoes.

French fried potatoes have long been known as a comestible and it has been common in the home to peel and trim raw potatoes, which are then sliced or cut to obtain desired shapes for subsequent frying in hot deep fat to provide French fried potatoes. Potatoes for French frying have been prepared commercially for a number of years and in these commercial processes the raw potatoes, after peeling and trimming, are washed and sliced into desired shapes, whereupon they are immediately fried after any necessary blanching. The fried potatoes can be frozen and sold in a frozen condition for use in the home after heating, as in an oven. Alternatively, the freshly cut potatoes can be refrigerated for relatively brief storage or can be frozen for later use in institutions such as hotels, restaurants, and the like.

A large development in the manufacture of French fried potatoes has resulted from the availability of dehydrated potatoes. This material can be readily shipped and stored and can be more or less standardized so as to overcome problems with mixed varieties of potatoes, with age of potatoes and with other factors. It is known that dehydrated potatoes can be made into a dough which is then formed or extruded and cut into desired shapes for deep fat frying. In this connection, U.S. Letters Pat. No. 3,085,020, issued Apr. 9, 1963, discloses a French fried potato product comprising dehydrated potato mixed with a cellulose methyl ether as a binder. U.S. Pat. No. 3,396,036, issued Aug. 6, 1968, also discloses a potato product for frying and the disclosed product comprises dehydrated potato mixed with milk solids as a binder. U.S. Pat. No. 3,399,062, issued Aug. 27, 1968, is also directed to a potato product comprising dehydrated potatoes and thermal-gelling cellulose ether as binder. Each of these products of the prior art are dry blends for mixing with water to form a dough which can be extruded and deep-fat fried.

However, this prior art has not yet provided French fried potatoes having all the desired properties. Some of these products require relatively expensive ingredients, have poor freeze-thaw stability or stick together when fried. In addition, various of these prior art products imbibe excessive amounts of frying oil or have undesired texture and eating properties. It is recognized that an improved dough product is desired for manufacture into French fried potatoes. Such an improved product can be made, according to this invention, by using an improved binder with dehydrated potatoes.

It is a principal object of this invention to provide an improved potato product which is adapted for frying.

It is a further object of this invention to provide an improved potato product having an improved binder system which is particularly adapted for the manufacture of French fried potatoes.

It is another object of this invention to provide a potato composition, including a starch binder, yielding extruded French fried potato product which has improved texture and eating quality, which imbibes little frying oil, which substantially avoids sticking of the fried pieces, and which has good freeze-thaw stability.

It is a still further object of this invention to provide an improved potato product which can be readily shaped or extruded for manufacture into French fried potatoes, the product comprising an improved starch binder which is compatible with the starch in the potatoes.

In general, the potato product of this invention comprises dehydrated potatoes which may be in the form of flakes, granules, flour, dehydrated diced potatoes, or mixtures thereof, and which is combined with a binder comprising an amylose starch component, a cold-water-dispersible starch derivative, and, if desired, special components which impart particular properties to the potato product.

It has been found that the starch binder of this invention yields potato shapes of higher quality, particularly in regard to crispness and freedom from oiliness. One of the deficiencies of binders used in the past is that they could be used only with certain dehydrated potato products. The starch binder of the present invention permits the use of all forms of dehydrated potatoes, with a much greater range of quality of the potatoes. It is, in fact, the most versatile binder yet known.

In addition, the starch binder of this invention imparts to the potato product improved stability in dry storage. The reasons for this are not now understood. A further advantage of the present binder is that the handling properties of the formed potato piece are better, that is, they have greater mechanical strength and can be handled with less breakage between the formation of the potato piece and frying.

Finally, it has been observed that the potato product of this invention has better flavor than products of the past, principally, it is believed, because of the bland flavor of the starch binder.

The binder, which is a mixture of starches, should be present in the potato product, on a dry basis, at a level of between about 8 and 50% by weight and the special components should comprise less than 15% of the potato product. The major proportion of the dry potato product, that is between 50 and 92% by weight, should be dehydrated potatoes. Moisture is added to the dry mix in an amount which is sufficient to hydrate the potato product and the amount of water will vary generally in a ratio of 1.5:1 to 3:1, the ratio being water-to-dry potato product on a weight basis.

In order to obtain the maximum yield of finished potato product, we have found that the water content should be limited to a value in the range of 1.7:1 to 2.2:1. (By yield is meant the weight ratio of finished, fried product to dry potato blend.) The desired yield should be more than 2.0 under current operating conditions, that is, 2.0 pounds of fried product per pound of dry potato blend. This is obtained with the present product using the preferred ratios. Also, if too much water is employed, the extruded piece is thin and lacks strength. With too little water, extrusion becomes difficult.

To assure smoothness of the formed product and for rapid hydration of the starch and dehydrated potato blend, all of the particles of the product of this invention should preferably pass through a 5 mesh sieve (U. S. Sieve Series).

The starch varieties included in the binder of this invention as necessary ingredients are an amylose starch component and a cold-water-dispersible starch component. Of the two, the amylose starch component represents the bulk of the binder and comprises about 50 to 90% by weight with the balance being the cold-water-dispersible component. As noted hereafter, other ingredients may be included with these two essential components and will comprise a minor fraction of the total binder weight, not in excess of 20% of the essential binder ingredients.

It has been found that the amylose starch component should contain more than about 25% amylose, preferably at least about 35%, and may include various treated starches. The amylose starch component, when heated with water in the mix, for example, in a frying oil, gelatinizes and retrogrades to form a retrograded starch "film" which functions as an oil "barrier" on the product so that the product does not imbibe undue amounts of frying oil. In addition, the amylose starch component adds strength to the product during and after frying. If the potato product does not include the amylose starch component, the porosity of the product is high and the product absorbs excessive amounts of frying oil and may also disintegrate during frying. The amylose starch performs the two functions of strengthening the product and of limiting oil absorption.

The following starch products provide the desired characteristics of the potato product of the invention when utilized as the amylose starch component:

Granular (ungelatinized) high-amylose starch containing 55% or more amylose, including the variety containing 70% amylose;

Granular edible esters of high-amylose starch, such as the acetate obtained by reaction with vinyl acetate or acetic anhydride;

Granular edible ethers of high-amylose starch, such as hydroxypropyl ether obtained by reaction with propylene oxide;

Amylose obtained by fractionating starch of usual (about 30% or less) amylose content, such as the amylose obtained from corn starch, in accordance with U.S. Pat. No. 3,067,067. Edible ethers and esters of this material may also be used.

Other edible ethers and esters may also be used, including those reacted with polyfunctional esterifying or etherifying reagents such as phosphorous oxychloride or epichlorohydrin. In general, it is desirable to keep the degree of substitution relatively low to assure rapid retrogradation of the amylose starch. For example, in the case of the acetate ester and hydroxypropyl ether 2% by weight substitution has been successfully used.

It is necessary, in order ot enjoy fully the benefits of the invention, that the amylose starch component be contemplated by another starch component which is a cold-water-dispersible starch derivative, i.e. forms a paste readily at temperatures well below the boiling point and preferably below 120° F. In this connection, it should be noted that, when the product of this invention is mixed with water to make a dough which is to be made into the formed product, it is desirable to use cool water, i.e. in the range of 45° to 60° F. to avoid too rapid hydration of the dehydrated potato. If the hydration is too rapid, there is a tendency for clumps of powder to be left on the xterior forming a kind of shell to prevent further penetration of water with resultant formation of the lumps. For this reason it is preferable that the starch also be dispersible in water at room temperature or slightly below. The cold-water-dispersible starch derivative should be present at a level of between about 1% and about 30% of the potato product and should comprise between about 10% and about 50% of the amylose starch plus dispersible components. The cold-water-dispersible starch derivative to be functional should have a Brookfield viscosity, when pasted in water at a level of 5%, in excess of 3500 centipoises after standing at ambient temperature (77° F.) for four hours. In this invention, the cold-water-dispersible starch derivative functions, in a sense, as a temporary binder, to hold the potato product together during forming or shaping and initial frying. The binding and strengthening function is taken over by the amylose starch component when it has sufficiently hydrated and gelatinized and retrograded. In the absence of the cold-water-dispersible starch derivative, the potato product tends to disintegrate before the amylose starch component is able to form its film and to function in the contemplated manner.

Starch of ordinary amylose content (15–30%) may be made cold-water-dispersible by drying an aqueous slurry or paste on steam-heated rolls or in a spray-dryer. Likewise, if the starch is etherified or esterified with a monofunctional reagent to a sufficient degree, it can be cold-water-dispersible. Reference may be made to such patents as U.S. Reissue Pat. Nos. 23,443, 26,256, U.S. Pat. Nos. 2,516,634, and 2,802,000.

The following commercially available starches have a Brookfield viscosity of at least 3500 centipoises after four hours and have been used as the cold-water-dispersible starch derivatives:

Potato starch reacted with 0.023% phosphorus oxychloride and dried on a drum dryer (Starch A).

Tapioca starch reacted with 0.0048% phosphorus oxychloride and with 3.7% propylene oxide and drum-dried in accord with U.S. Pat. No. 3,422,088 (Starch B).

Corn starch reacted dry with 20% propylene oxide (based on starch dry substance), in accordance with U.S. Pat. Nos. 2,516,632 and 2,516,634, and washed with ethanol to remove by-product glycols (Starch C).

Roll-dried waxy maize starch sold under the name "Instant Clearjel" by National Starch and Chemical Co.; this is understood to be an acetate ester that has been reacted with a cross-linking reagent.

Other optional special components, as above indicated, can be used in the binder at a level below about 15% of the weight of the binder to improve the eating characteristics of the French fried potatoes. These components can serve to modify the texture of the product, improve the extrusion properties, regulate the rate of hydration, improve stability of the dry mix, and/or modify or enhance flavor characteristics. For example, a roll-dried gelatinized tapioca starch derivative of propylene oxide (3.7%) and phosphorus oxychloride (0.026%) may be added at a level of 8% to 12% of the binder to improve the texture and extrusion properties of the dough. This starch also imparts improved "mealiness" of the potato product.

We found that, under some conditions, it is possible to replace some or all of the cold-water-dispersible starch with water-dispersible, edible vegetable gums. Among the gums that are useful may be named guar gum, locust bean gum, tragacanth gum, gum arabic, and gum karaya. However, it appears that these gums are either substantially less effective in preventing excess absorption of frying oil into the French fry or impart an undesirable flavor or texture to the final product. Because of these shortcomings of the gums, the cold-water-dispersible starch is superior for this application.

Ungelatinized starch such as corn starch, or preferably tapioca, is another special component which can be added. When present, it produces a dough which puffs upon cooking. Such tapioca starch also tends to slow the hydration of the potato product and improves the extrusion characteristics of the dough. The hydration may also be slowed and the extrusion properties improved by the addition of granular (ungelatinized) tapioca starch reacted with 0.025% phosphorus oxychloride.

Dextrose can be added in small quantity, up to 5%, for example, to improve flavor and especially to modify the browning of the fried piece. The amount of dextrose used can be varied to take account of the reducing sugar content of the dehydrated potato.

Salt (sodium chloride or the equivalent in potassium chloride) may be added also in amounts up to 5% of the potato product to impart a salty taste, and it also functions to moderate the rate of hydration of the dough. Of course, other flavoring agents may be added.

The drying potato product of this invention is made by blending the dry binder ingredients including optional components to modify texture, taste and rate of hydration and of extrusion. The binder blend is added to the dehydrated potatoes in whatever form is used.

Dehydrated crushed diced potatoes will provide a different and improved texture to the resulting dough product. However, it is preferred that this component replace the dehydrated potatoes so that no more than about 30% of the dry potato product are dehydrated crushed diced potatoes. For example, if a given dry potato product contans 60% dehydrated potatoes, up to about one half of this amount (30% of the dry potato product) can be dehydrated crushed diced potatoes while the remainder of the 60% are dehydrated potatoes in another form. Use of dehydrated crushed diced potatoes beyond this preferred level leads to final product potato pieces that stick together when fried. Other components may also be added dry to the product to further modify texture and taste characteristics.

The dry potato product is sold for use in restaurants and in catering, for example. When potatoes are to be made, the dry mix is combined with cold water which is stirred in briskly. The amount of water is, as above pointed out, to provide sufficient moisture for the hydration of the dry mix. The resulting dough is placed in an extruder or other device which may form the dough into various shapes, as desired. Typically, this may be in the usual "French fry" form of square cross section. The formed product is placed in hot oil which is at a temperature in excess of 250° F. to make sure that the amylose component is gelatinized and preferably at a temperature in excess of 350°F. The optimum is 375° to 400° F. The temperature and time should be sufficient to cause the amylose starch component to form the film and pevent undue imbibition of oil. The potato product is fried until it is browned and then it is removed from the hot oil.

The dry blend of the invention has excellent freeze-thaw stability and is acceptable after storage at elevated temperature (115°–120° F.) for one month or more in air. The properties of commercial dehydrated potatoes limit the storage time of the dry blend under these conditions. The dough, after shaping, can be frozen and kept for extended periods whereupon it can be subsequently fried. These frozen and stored products provide French fries having comparible characteristics to products from freshly made dough. Refrigerated storage (of the oder of 40° F.) is satisfactory for a few days depending on microbial spoilage of the potato ingredient.

The following examples are merely illustrative and should not be construed as limiting the scope of this invention.

EXAMPLE I

As a particular example of the practice of the invention for the manufacture of the improved potato product, granular, high-amylose starch (55% amylose, Class V amylomaize starch) was blended dry with a cold-water-dispersible pregelatinized potato starch derivative (Starch A, above), a granular tapioca starch derivative (phosphorus oxychloride-crosslinked hydroxypropyl ether) and food-grade salt. The mixture comprised the ingredients in the following percentages:

| Ingredients | % As Is Basis |
| --- | --- |
| High-amylose starch | 70.0% |
| Pregelatinized potato starch derivative | 17.0% |
| Tapioca starch derivative | 9.5% |
| Granulated salt | 3.5% |

The binder was then blended in a ratio of 1:4 with dehydrated potato granules to form a potato product. To use this product, one part of the mixture was mixed with two parts of cold tap water with brisk stirring. The resulting dough was allowed to stand undisturbed for ten minutes, whereupon it was extruded in square cross-section and fried in deep fat at a temperature between 375° and 400° F. The potato product remained in the fryer for 75 seconds. Immediately on removal from the fryer, the fries were tested by breaking in two and they remained square in cross section. The fried potato product shapes did not stick together and had good texture and flavor with minimum oiliness.

The dry blend of potato granules and binder of Example I had excellent freeze-thaw stability and was acceptable after storage at 115°–120° F. for over 40 days, even though there was some deterioration of the flavor of the potatoes (but not the binder).

A portion of the extruded product of Example I was frozen at 0°F., held for 2 weeks, whereupon it was fried in deep fat. The French fried shapes compared well with those which were freshly made.

EXAMPLE II

In another example in the practice of the invention, the potato product was made in accordance with the previous example, except that 10% of the potato granules were replaced with dehydrated crushed diced potatoes. The resulting product had improved flavor and texture over the product of Example I.

EXAMPLE III

As a further example of the practice of the invention, the potato product was prepared in accordance with Example I except that potato flakes (ground to pass through a 5-mesh screen) were substituted for the granular potatoes. French fried shapes were comparable.

EXAMPLE IV

As a further example of the practice of the invention, amylose obtained by fractionating corn starch, as mentioned above, was substituted for the high-amylose starch in Example I. The resulting product had excellent characteristics.

EXAMPLE V

As a further example of the practice of the invention, the high-amylose starch of Example I was blended with the hydroxypropyl ether of corn starch identified above as Starch C. The latter is a cold-water-dispersible product and the blend contained 85% amylose component and 15% cold-water-dispersible component. No other starch was used. The product of the invention made with potato granules according to the formula of Example I was excellent when made into French fried potatoes.

The product of this invention has distinct advantages over the products heretofore prepared and provides a potato product having improved properties and characteristics. The potato product does not imbibe excessive amounts of oil and provides French fries of improved texture and eating quality.

The various features of the invention which are believed to be new are set forth in the following claims.

I claim:
1. A method for making a French fried potato product from finely divided dehydrated potatoes comprising the steps of:
   A. preparing a potato dough by mixing 1.5 to 3.0 parts by weight water with one part by weight of an edible dry product at a mixing temperature below 120° F., said dry product comprising:
      i. between 50 to 92% by weight finely divided dehydrated potatoes of a particle size less than 5 mesh sieve (U.S. sieve series);
      ii. about 1% to 30% by weight cold-water-dispersible starch wherein the cold-water-dispersible starch is characterized as having a starch pasting temperature of less than 120° F. and serving as a binder for the potato dough when mixed with water at the dough mixing temperature;
      iii. between 5 and 45% by weight of a high amylose starch wherein the high amylose starch is characterized as containing more than 35% by weight amylose and remaining in the prepared dough as starch solids when the high amylose starch is mixed with water at the dough mixing temperature;
      iv. less than 15% by weight taste-and-texture-modifying components;
   B. shaping the potato dough into the desired shape; and
   C. frying the shaped dough in frying oil at a temperature in excess of 250° F. until browned and thereby providing a French fried potato product.
2. The method of claim 1 wherein 1.7 to 2.2 parts of water is combined with one part of dry product.
3. The method of claim 1, wherein the cold-water-dispersible starch is dispersible in water at from 45° to 77° F. and has a Brookfield viscosity when pasted in water at a level of 5% by weight, in excess of 3500 centipoises after standing at 77° F. for 4 hours.
4. The method of claim 1, wherein said dough additionally comprises water dispersible edible vegetable gum.
5. The method of claim 1, wherein the frying temperature is between 357° to 400° F.
6. The method according to claim 1 wherein the high amylose starch is gelatinized and forms a retrograded starch film when the shaped forms are subjected to frying step C.
7. The method according to claim 6 wherein the high amylose starch contains at least 55% by weight of amylose.
8. The method according to claim 7 wherein the cold-water-dispersible starch is dispersible in water at temperatures from 45° to 77° F and has a Brookfield viscosity when pasted in water at a level of 5% by weight in excess of 3,500 centipoises after standing at 77° F. for 4 hours.
9. The method of claim 1 wherein said finely divided dehydrated potatoes comprise granules of flakes.
10. The method according to claim 9 wherein the high amylose starch consists essentially of at least one edible amylose starch component selected from the group consisting of a retrograded, amylose starch fraction and a granular, high-amylose starch.
11. The method according to claim 10 wherein the high amylose starch contains at least 55% by weight amylose.
12. The method according to claim 11 wherein the high amylose starch comprises a granular, high amylose starch in an amount ranging from about 50% to about 90% by weight of the combined total dry solids weight of said edible amylose starch component and said cold-water-dispersible starch component.
13. The method according to claim 12 wherein the mixture contains dehydrated, crushed, diced potatoes in an amount up to 30% by weight of the dehydrated potatoes.
14. The method according to claim 12 wherein the mixture contains from 1.7 to 2.2 parts by weight water for each part by weight of dry potato product.
15. The method of claim 12 wherein the cold-water-dispersible starch is dispersible in water at temperatures from 45° to 77° F and has a Brookfield viscosity (when pasted in water at a level of 5% by weight) in excess of 3,500 centipoises after standing at 77° F. for 4 hours.
16. The method of claim 12 wherein said dough additionally comprises a water dispersible, edible vegetable gum.
17. The method of claim 12 wherein the frying temperature is greater than 350° F.
18. The method according to claim 9 wherein the high amylose starch gelatinizes and retrogrades when the shaped forms are subjected to frying step C.
19. The method according to claim 18 wherein the edible high amylose starch consists essentially of a granular high amylose starch which has an amylose content of at least 55% by weight.
20. The method according to claim 19 wherein the cold-water-dispersible starch is dispersible in water at temperatures from 45° to 77° F and has a Brookfield viscosity when pasted in water at a level of 5% by weight in excess of 3,500 centipoises after standing at 77° F. for 4 hours.
21. The method according to claim 3 wherein the potato dough is prepared at a dough mixing temperature within the range of 45° to 60° F.
22. The method according to claim 20 wherein the potato dough is prepared at a dough mixing temperature within the range of 45° to 60° F.

* * * * *

UNITED STATES PATENT AND TRADEMARK OFFICE
CERTIFICATE OF CORRECTION

PATENT NO. : 3,987,210
DATED : October 19, 1976
INVENTOR(S) : Charles W. Cremer

It is certified that error appears in the above-identified patent and that said Letters Patent are hereby corrected as shown below:

Column 1, line 7, for "Creme" read ---Cremer---
Column 1, line 30, for "large" read ---later---
Column 3, line 56, for "ot" read ---to---
Column 3, line 68, for "xterior" read ---exterior---
Column 5, line 29, for "drying" read ---dry---
Column 6, line 9, for "oder" read ---order---
Column 7, line 62, for ---at from 45°--- read ---at temperatures from 45°---
Column 8, line 2, for "357°" read ---375°F.---
Column 8, line 21, for "edible amylose starch component selected" read ---high amylose starch selected---
Column 8, bridging lines 31/32, for "edible amylose starch component and said cold-water-dispersible starch component" read ---edible amylose starch and said cold-water-dispersible starch---

Signed and Sealed this

Fifth Day of April 1977

[SEAL]

Attest:

RUTH C. MASON
*Attesting Officer*

C. MARSHALL DANN
*Commissioner of Patents and Trademarks*